(12) United States Patent
Smith

(10) Patent No.: US 7,785,197 B2
(45) Date of Patent: Aug. 31, 2010

(54) VOICE-TO-TEXT CHAT CONVERSION FOR REMOTE VIDEO GAME PLAY

(75) Inventor: Darren C. Smith, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 1027 days.

(21) Appl. No.: 10/901,452

(22) Filed: Jul. 29, 2004

(65) Prior Publication Data

US 2006/0025214 A1 Feb. 2, 2006

(51) Int. Cl.
*A63F 13/00* (2006.01)
(52) U.S. Cl. ............................... 463/30; 463/31; 463/35
(58) Field of Classification Search ................. 704/246; 455/426; 463/30

See application file for complete search history.

(56) References Cited

U.S. PATENT DOCUMENTS

| | | |
|---|---|---|
| 4,445,187 A | 4/1984 | Best |
| 4,937,853 A | 6/1990 | Brule et al. |
| 5,048,831 A | 9/1991 | Sides |
| 5,051,822 A | 9/1991 | Rhoades |
| 5,149,104 A | 9/1992 | Edelstein |
| 5,161,803 A | 11/1992 | Ohara |
| 5,292,125 A | 3/1994 | Hochstein et al. |
| 5,347,306 A | 9/1994 | Nitta |
| 5,396,225 A | 3/1995 | Okada et al. |
| 5,479,491 A | 12/1995 | Herrero Garcia et al. |
| 5,538,255 A | 7/1996 | Barker |
| 5,553,120 A | 9/1996 | Katz |
| 5,618,045 A | 4/1997 | Kagan et al. |
| 5,624,316 A | 4/1997 | Roskowski et al. |
| 5,632,681 A | 5/1997 | Bakoglu et al. |
| 5,646,629 A | 7/1997 | Loomis et al. |
| 5,685,775 A | 11/1997 | Bakoglu et al. |
| 5,701,580 A | 12/1997 | Yamane et al. |
| 5,702,305 A | 12/1997 | Norman et al. |
| 5,771,438 A | 6/1998 | Palermo et al. |
| 5,791,992 A | 8/1998 | Crump et al. |
| 5,799,240 A | 8/1998 | Miyashita |
| 5,809,520 A | 9/1998 | Edwards et al. |

(Continued)

FOREIGN PATENT DOCUMENTS

EP 0 868 032 A2 9/1998

(Continued)

OTHER PUBLICATIONS

Aaron Boulding "The XBOX Live Faqs" (URL: http://xbox.ign.com/articles/361/361526p1.html).*

(Continued)

*Primary Examiner*—John M Hotaling, II
(74) *Attorney, Agent, or Firm*—Nixon & Vanderhye P.C.

(57) ABSTRACT

A multi-player networked video game playing system including for example video game consoles analyzes speech to vary the font size and/or color of associated text displayed to other users. If the amplitude of the voice is high, the text displayed to other users is displayed in a larger than normal font. If the voice sounds stressed or is aggressive words are used, the text displayed to other users is displayed using a special font such as red color. Other analysis may be performed on the speech in context to vary the font size, color, font type and/or other display attributes.

14 Claims, 3 Drawing Sheets

U.S. PATENT DOCUMENTS

| | | | |
|---|---|---|---|
| 5,870,465 | A | 2/1999 | Hosbach et al. |
| 5,890,152 | A | 3/1999 | Rapaport et al. |
| 5,904,620 | A | 5/1999 | Kujawa |
| 5,944,608 | A | 8/1999 | Reed et al. |
| 5,951,775 | A | 9/1999 | Tepman |
| 5,956,485 | A | 9/1999 | Perlman |
| 5,961,396 | A | 10/1999 | Morell et al. |
| 5,970,418 | A | 10/1999 | Budd et al. |
| 5,971,855 | A | 10/1999 | Ng |
| 5,984,783 | A | 11/1999 | Kikuchi et al. |
| 5,987,386 | A | 11/1999 | Merchant |
| 6,018,766 | A | 1/2000 | Samule et al. |
| 6,023,729 | A | 2/2000 | Samuel et al. |
| 6,112,084 | A | 8/2000 | Sicher et al. |
| 6,117,013 | A | 9/2000 | Eiba |
| 6,134,590 | A | 10/2000 | Perlman |
| 6,151,571 | A | 11/2000 | Pertrushin |
| 6,152,824 | A | 11/2000 | Rothschild |
| 6,183,367 | B1 | 2/2001 | Kaji |
| 6,192,333 | B1 | 2/2001 | Pentheroudakis |
| 6,192,395 | B1 | 2/2001 | Lerner et al. |
| 6,219,045 | B1 | 4/2001 | Leahy et al. |
| 6,219,695 | B1 | 4/2001 | Guttag et al. |
| 6,241,612 | B1 | 6/2001 | Heredia |
| 6,243,373 | B1 | 6/2001 | Turock |
| 6,257,982 | B1 | 7/2001 | Rider et al. |
| 6,275,792 | B1 | 8/2001 | Lewis |
| 6,302,795 | B1 | 10/2001 | Ito |
| 6,306,039 | B1 | 10/2001 | Kaji et al. |
| 6,308,154 | B1 | 10/2001 | Williams et al. |
| 6,315,669 | B1 | 11/2001 | Okada et al. |
| 6,360,104 | B1 | 3/2002 | Budd et al. |
| 6,373,462 | B1 | 4/2002 | Pan et al. |
| 6,438,124 | B1 | 8/2002 | Wilkes et al. |
| 6,449,344 | B1 | 9/2002 | Goldfinger et al. |
| 6,487,583 | B1 | 11/2002 | Harvey et al. |
| 6,496,693 | B1 * | 12/2002 | Tran .................. 455/426.1 |
| 6,496,851 | B1 | 12/2002 | Morris et al. |
| 6,515,690 | B1 | 2/2003 | Back et al. |
| 6,519,629 | B2 | 2/2003 | Harvey et al. |
| 6,523,068 | B1 | 2/2003 | Beser et al. |
| 6,561,811 | B2 | 5/2003 | Rapoza et al. |
| 6,677,968 | B1 | 1/2004 | Appelman |
| 6,694,352 | B1 | 2/2004 | Omoigui |
| 6,755,743 | B1 | 6/2004 | Yamashita et al. |
| 6,807,562 | B1 | 10/2004 | Pennock et al. |
| 6,881,147 | B2 | 4/2005 | Naghi et al. |
| 6,905,414 | B2 | 6/2005 | Danieli et al. |
| 6,908,389 | B1 | 6/2005 | Puskala |
| 6,928,329 | B1 | 8/2005 | Giaimo et al. |
| 6,932,708 | B2 | 8/2005 | Yamashita et al. |
| 6,935,959 | B2 | 8/2005 | Danieli et al. |
| 6,987,514 | B1 | 1/2006 | Beresin et al. |
| 7,222,075 | B2 | 5/2007 | Petrushin |
| 2001/0016519 | A1 | 8/2001 | Choe |
| 2002/0165024 | A1 | 11/2002 | Puskala |
| 2002/0174248 | A1 | 11/2002 | Morriss |
| 2002/0198707 | A1 * | 12/2002 | Zhou .................. 704/231 |
| 2003/0080989 | A1 | 5/2003 | Matsuda et al. |
| 2003/0190960 | A1 | 10/2003 | Jokipii et al. |
| 2003/0216178 | A1 | 11/2003 | Danieli et al. |
| 2003/0216181 | A1 | 11/2003 | Danieli et al. |
| 2004/0062364 | A1 * | 4/2004 | Dezonno et al. ......... 379/88.14 |
| 2004/0109023 | A1 | 6/2004 | Tsuchiya |
| 2004/0152487 | A1 | 8/2004 | Peng |
| 2004/0198498 | A1 | 10/2004 | Yamashita et al. |
| 2005/0021159 | A1 | 1/2005 | Ogawa |
| 2005/0071481 | A1 | 3/2005 | Danieli |
| 2005/0113169 | A1 | 5/2005 | Danieli et al. |
| 2005/0159833 | A1 | 7/2005 | Giaimo et al. |
| 2005/0169252 | A1 | 8/2005 | Riggs |
| 2005/0181815 | A1 | 8/2005 | Shostak |
| 2005/0181878 | A1 | 8/2005 | Danieli et al. |
| 2005/0245317 | A1 | 11/2005 | Arthur et al. |
| 2006/0015560 | A1 | 1/2006 | MacAuley et al. |

FOREIGN PATENT DOCUMENTS

| | | | |
|---|---|---|---|
| EP | 1152326 | * | 4/2001 |
| GB | 2287414 | | 9/1995 |
| GB | 2331195 | A | 9/2000 |
| JP | 7-088253 | | 4/1995 |
| JP | 10-076071 | | 3/1998 |
| JP | 10-192483 | | 7/1998 |
| JP | 11-088508 | | 3/1999 |
| JP | 11-137851 | | 5/1999 |
| JP | 11-271420 | | 10/1999 |

OTHER PUBLICATIONS

"JBL Professional Sound System Design Reference Manual,"(Jan. 1999).

Pinkfish, "File events.c," http://www.lost/nu/autodoc/global.events.c.html, 22 pages (Jun. 29, 2000).

Samuel, Dan, "Well of Souls Really Old Release Notes," http://www.synthetic-reality.com/wosReleaseOld.htm, 63 pages (1998-2000).

Getty, Jim W., "Xbox Live: Xbox Voice Communication," 3 pages (2004).

Product Information, "Xbox Live Starter Kit," 2 pages (2004).

"Xbox Live Instruction Manual," (2003).

"Xbox Communicator," Instruction Manual (2003).

"Game Commander vs. Voice," http://www.gamecommander.com/products/gcvsgv.html, 5 pages, Mindmaker Inc. (copyright 1999-2003).

"Game Commander 3," http://www.gamecommander.com/products/gc3.html, 7 pages, Mindmaker Inc. (copyright 1999-2003).

"Game Commander 2 User's Guide," http://www.gamecommander.com/products/gcvsgv.html, 5 pages, Mindmaker Inc. (copyright 2001).

"Roger Wilco—Voice Chat for Games," http://rogerwilco.gamespy.com/, 2 pages (Jul. 8, 2003).

"Attention Teamspeak Users," http://www.teamspeak.org/, 4 pages (Oct. 6, 2004).

"Ventrilo—Scalable Voice Communication Software," http://www.ventriolo.com/, 1 page (1999).

"Thrustmaster Europe—Products," http://europe.thrustmaster.com/products/dsp_fam.php?fam=44, 2 pages (2002).

"MacSpeech, iListen 1.6," 4 pages.

"Home Office Reports Review of Voice Recognition Software," http://www.homeofficereports.com/Voice%20Recognition%20Software.htm, 16 pages (Jun. 9, 2004).

"Dragon Naturally Speaking Medical Suite 7.3," http://www.1st-dragon.com/dragnatspeak2.html. 2 pages.

* cited by examiner

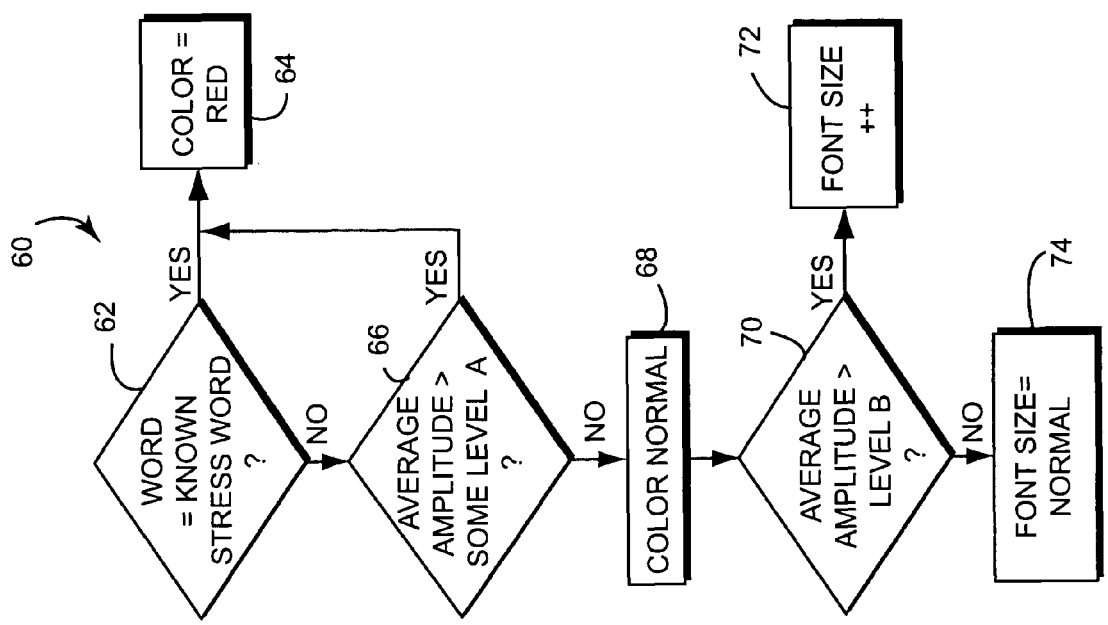
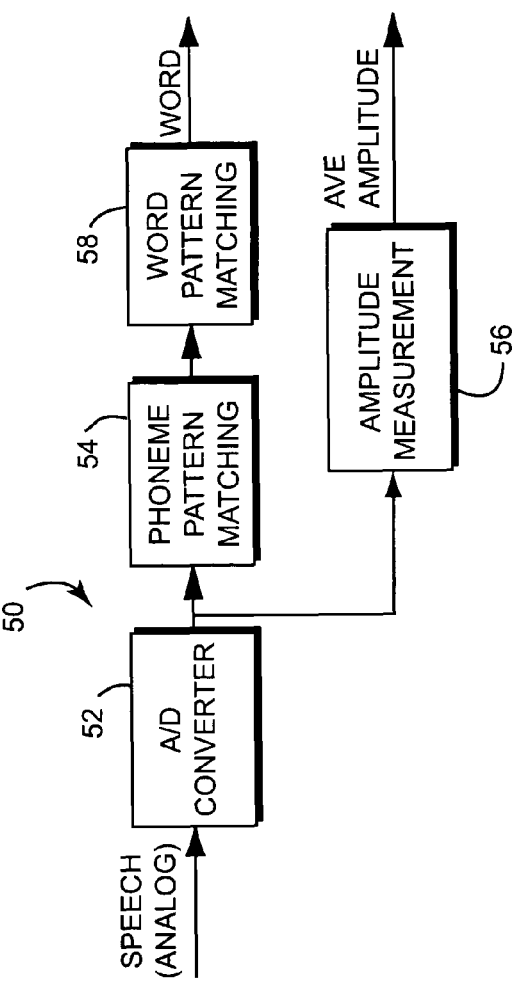
Figure 3
Figure 2

VOICE-TO-TEXT CHAT CONVERSION FOR REMOTE VIDEO GAME PLAY

CROSS-REFERENCES TO RELATED APPLICATIONS

This case is related to commonly assigned copending patent application Ser. No. 10/901,453, entitled "Video Game Voice Chat With Amplitude-Based Virtual Range", incorporated herein by reference.

STATEMENT REGARDING FEDERALLY SPONSORED RESEARCH OR DEVELOPMENT

Not applicable.

FIELD

The technology herein relates to remote or networked video game play, and more particularly to networked video game play wherein remote users can communicate with one another. In still more detail, the technology herein relates to method and apparatus providing remote video game play wherein a player's speech is converted into text chat and responsively formatted for textual display or other indication at remote player sites.

BACKGROUND AND SUMMARY

Networked and remote video game play has become increasingly popular. For several years now, game players using personal computers have played Doom, Quake and other multiplayer networked games over the Internet. Such multiplayer games can involve a number of different game players from all over the country or the world.

One especially interesting genre of remote video games uses a team approach where the various players align themselves in teams and work together to accomplish a particular objective (defeat another team, beat another team in locating a treasure or fulfilling some other quest, etc.). It is useful in these and other multiplayer video game contexts to allow the various game players to communicate with one another during game play. For example, members of the same team may wish to strategize so they can work together more effectively. Sometimes, players on opposite sides of a challenge may wish to communicate information or otherwise coordinate their game play. Adding an inter-player communications capability raises the fun factor substantially. Rather than simply sitting alone in front of a computer or television set moving a game character on a screen, the game play experience becomes much more interactive and personal when one is communicating with a group of friends or acquaintances.

While some game players have been known to talk together on the telephone while they are involved in remote game play, many in the gaming industry have sought to provide a chat capability as a part of or as an adjunct to the video game software. Early approaches, especially on PC games, provided a text chat capability allowing players to send text messages to one another. A player would use the keyboard to type in a message which was instantly sent over the same communications medium carrying interactive game play information back and forth. Such text messages could be replied to by other players in the same way to provide interactive text "chat" communications.

The effectiveness of such text chat capabilities depended on the type of game. For a relatively slow-moving long term adventure or other game, text chat could be quite effective in allowing players to coordinate their activities while at the same time communicating fun and interesting information about themselves. However, because of the required use of a keyboard to input the text information, many players found text chat to be somewhat incompatible with other types of games such as more fast-moving interactive games with time pressure. Many personal computer and other games are primarily controlled through use of a joystick or other game type controller. To send a text chat message, the user generally needed to move his or her hands off of the game controller onto a keyboard to begin typing. Once the user finished typing a message, he or she hit a "send" button and then returned to interacting with the video game using the joystick or other game controller. While the user's hands were on the keyboard, the user was often unable to interact with the game via the joystick. Such interruptions were found to be generally undesirable. Furthermore, not all game players have good typing skills. Younger game players or those who have not yet learned to touch type often found the keyboard to be an obstacle that tended to slow down fast-moving video game play.

To solve this problem and also take advantage of the relatively higher communications bandwidths now available to most gamers via DSL, cable or other communications means, several software developers and game companies developed voice chat capabilities for use in remote video game play. To use voice chat, game players typically put on headsets that include both earphones and a microphone. Software and hardware within the personal computer or gaming platform digitizes voice picked up by the microphone and transmits the resulting digital information to other game players. At the remote side, received digitized speech signals are converted back into audio, amplified and played back through remote game players' headsets. Voice chat eliminates the need for game players to use a keyboard while providing nearly instantaneous inter-player communications and coordination.

While voice chat has been widely adopted in the gaming community and has achieved a fair degree of success, text chat is still being used by some because of several advantages it provides over voice chat. Communicating with other online players in massive multiplayer online role playing games, for example, is still often provided by text chat rather than voice chat. Text chat provides a record of conversations so that players can review exactly what was said by other players, and also provides the ability to easily identify the player who sent a particular message (text can be tagged with a speaker's identity). In addition, using text chat, one player's statements can be easily separated from another player's statements since the text typically appears separately (this can also be done with voice chat using a half-duplex type communications system, but this might be somewhat frustrating to the speakers). Additionally, unlike most voice chat, text chat provides the ability to mask the player's true identity. This can be useful when the game play includes avatars that in effect provide an "alter ego" for each human player. For example, if a 12 year old boy is playing the role of a 40 year old warrior, voice chat can spoil or detract from the game play experience since the warrior ends up having the voice of a 12 year old. Additional advantages of text chat include the ability to monitor and censor player conversations for bad language, and reduction in the amount of bandwidth required to convey the information.

Despite the continued usefulness of text chat in some game play contexts, using the keyboard continues to have significant disadvantages, especially for console or other game platforms that do not include keyboards. A keyboard is a bulky accessory, and it detracts from game play if the user has to remove his hands from the controller to type a message. The impersonation problem with voice chat can be addressed by providing voice filters that alter the sound of a player's voice, but so far players have not generally been using such voice masking since the resulting sound quality can be relatively low and intelligibility ends up being sacrificed.

In some non-gaming contexts (e.g., America Online's Instant Messenger), some have attempted to provide a chat alternative in the form of voice-to-text conversion. However, further improvements in the gaming context are necessary and desirable if such techniques are to become more widely adopted.

The technology herein addresses these problems by providing a video game chat capability with voice-to-text conversion that identifies characteristics of the player's speech and selects text display formatting based on such identified characteristics. In more detail, a non-limiting illustrative exemplary implementation runs on a video game console or associated server and analyzes the player's speech to vary the font size, color or other text display formatting for display to other users. For example, if the amplitude of a player's voice is high, the text may be displayed to other users in a larger than normal font. If the voice sounds stressed or aggressive words are used, the text is displayed to other users in a special format (e.g., using a distinctive color such as red or other distinctive formatting). Other analysis may be done on speech in context to vary the text formatting options such as font size, color, font type, or other aspects of the text presentation and/or display.

BRIEF DESCRIPTION OF THE DRAWINGS

These and other features and advantages will be better and more completely understood by referring to the following detailed description in conjunction with the drawings of which:

FIG. 2 is a schematic diagram of an exemplary, illustrative non-limiting voice-to-text conversion;

FIG. 3 is a flowchart of an exemplary, illustrative non-limiting text formatting and display.

DETAILED DESCRIPTION

Figure 1:
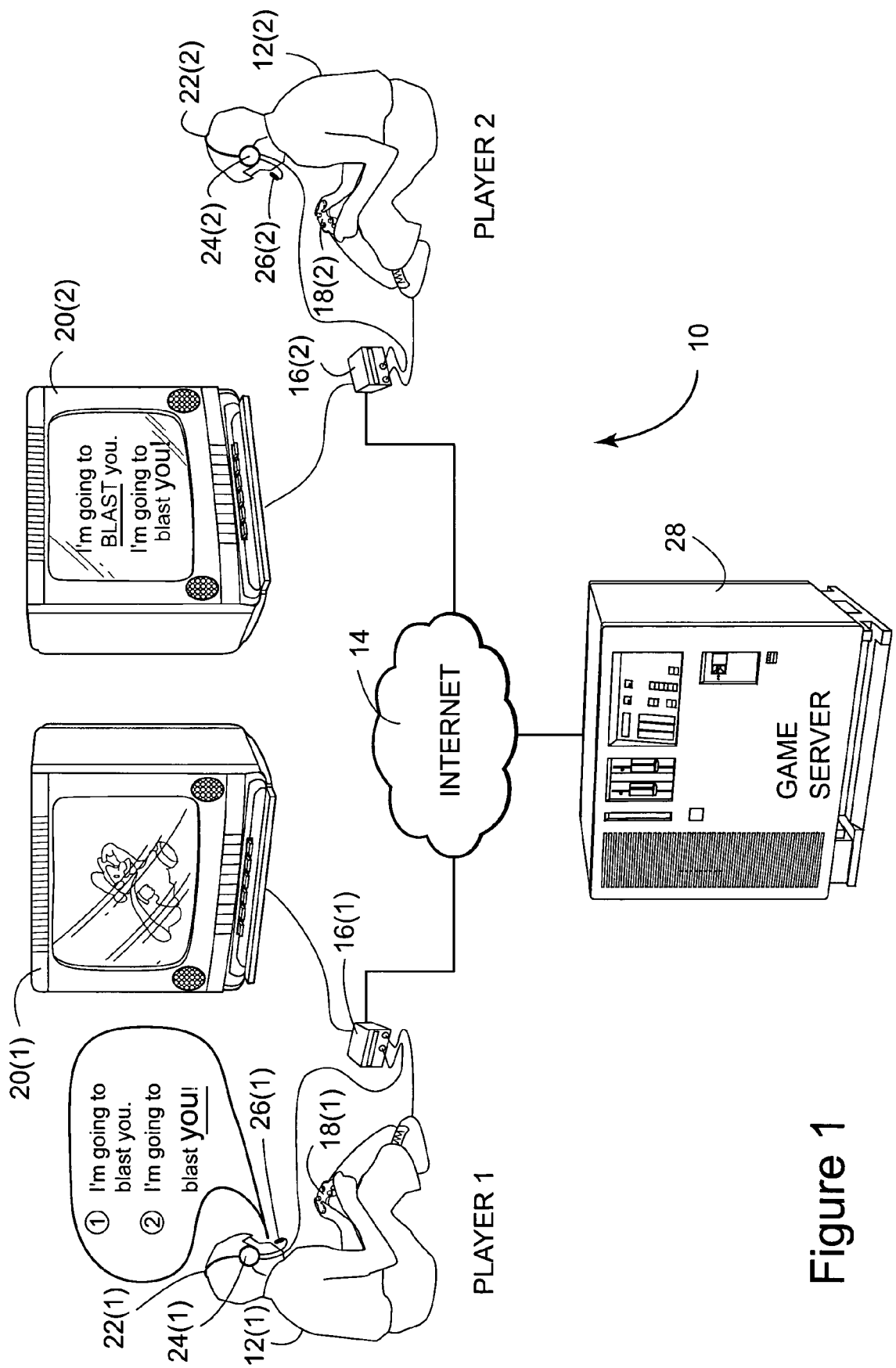
FIG. 1 is a schematic illustration of an exemplary, illustrative non-limiting implementation.

FIG. 1 schematically shows an example non-limiting illustrative implementation of a multi-player gaming system 10. In the example implementation shown, video game player 12(1) plays a video game against another video game player 12(2) (any number of players can be involved). Video game players 12(1) and 12(2) may be remotely located, with communications being provide between them via a network 14 such as the Internet or any other signal path capable of carrying game play data or other signals. In the example system 10 shown, each game player 12 has available to him or her electronic video game playing equipment 16. In the example shown, video game playing equipment 16 may comprise for example a home video game platform such as a NINTENDO GAMECUBE system connected to a handheld game controller 18 and a display device 20 such as a home color television set. In other examples, game playing equipment 16 could comprise a handheld networked video game platform such as a NINTENDO DS or GAMEBOY ADVANCE, a personal computer including a monitor and appropriate input device (s), a cellular telephone, a personal digital assistant, or any other electronic or other appliance.

In the example system 10 shown, each of players 12 has a headset 22 including earphones 24 and a microphone 26. Earphones 24 receive audio signals from game playing equipment 16 and play them back into the player 12's ears. Microphone 26 receives acoustical signals (e.g., speech spoken by a player 12) and provides associated audio signals to the game playing equipment 16. In other exemplary implementations, microphone 26 and earphones 24 could be separate devices or a loud speaker and appropriate feedback-canceling microphone could be used instead. In the example shown in FIG. 1, both of players 12(1) and 12(2) are equipped with a headset 22, but depending upon the context it may be that only some subset of the players have such equipment.

In the example system 10 shown, each of players 12 interacts with video game play by inputting commands via a handheld controller 18 and watching a resulting display (which may be audio visual) on a display device 20. Software and/or hardware provided by game playing platforms 16 produce interactive 2D or 3D video game play and associated sound. In the example shown, each instance of game playing equipment 16 provides appropriate functionality to produce local video game play while communicating sufficient coordination signals for other instances of the game playing equipment to allow all players 12 to participate in the "same" game. In some contexts, the video game could be a multi-player first person shooter, driving, sports or any other genre of video game wherein each of players 12 can manipulate an associated character or other display object by inputting commands via handheld controllers 18. For example, in a sports game, one player 12(1) could control the players of one team, while another player 12(2) could control the players on an opposite team. In a driving game, each of players 12(1), 12(2) could control a respective car or other vehicle. In a flight or space simulation game, each of players 12 may control a respective aircraft. In a multi-user role playing game, each of players may control a respective avatar that interacts with other avatars within the virtual environment provided by the game. Any number of players may be involved depending upon the particular game play.

As will be seen in FIG. 1, a game server 28 may optionally be provided to coordinate game play. For example, in the case of a complex multiplayer role playing game having tens or even hundreds of players 12 who can play simultaneously, a game server 28 may be used to keep track of the master game playing database and to provide updates to each instance of game playing equipment 16. In other game playing contexts, a game server 28 may not be necessary with all coordination being provided directly between the various instances of game playing equipment 16.

In the particular example system 10 shown in FIG. 1, a voice-to-voice text chat capability is provided. As can be seen, player 12(1) in this particular example is speaking the following words into his or her microphone 26:

"I'm going to blast you."

In response to this statement, game playing equipment 16 and/or game server 28 converts the spoken utterance into data representing associated text along with formatting information responsive to detected characteristics of the utterance. For example, the speech-to-text converter may recognize the term "blast" as being a special "threat" term, and cause the resulting text message to be displayed on the other player(s)' display 20(2) using a special format such as for example: "I'm going to BLAST you."

The special formatting may be the user of all capital letters, use of a special size or style of font (e.g., italics, bold, or some other special typeface), the use of a special color (e.g., red for threats, blue for statements of friendship, green for statements of emotion, yellow for statements of fear, etc.), or any other sort of distinctive visual, aural or other indication.

As another example shown in FIG. 1, suppose player 12(1) says "I'm going to blast you!" in a loud voice emphasizing the word "you." The non-limiting exemplary speech-to-text converter in the example system 10 shown in FIG. 1 recognizes the increased amplitude and/or different inflection or emphasis placed on the word "you" and may provide an associated display on the other player(s)' display 20(2) that includes punctuation, formatting or other indications emphasizing the displayed text "you," for example: "I'm going to blast you!"

Such recognition may be in context, on a word-by-word or sound-by-sound basis, or using any other characteristic such as speech loudness, speech pitch, speech tone, whether the player is shouting or whispering, articulation, inflection, language (e.g., English, French, German, Japanese, etc.), vocabulary, pauses or any other characteristic of speech. The associated formatting based on the recognition of such predetermined characteristic can take any form such as size of displayed text, color of displayed text, language of displayed text, timing of displayed text, other information displayed along with text, sounds played while text is being displayed, scrolling or other movement of displayed text, introduction of visual or audio effects highlighting displayed text, selection of different displays for displaying displayed text, selection of portions of display 20 for displaying displayed text, or any other attribute perceptible by player 12(2).

FIG. 2 shows an example illustrative non-limiting implementation of a speech-to-text converter 50 that may be used by example system 10—either in or with game playing equipment 16, within game server 28 or both. In the example shown, analog speech received from a microphone 26 is converted into digital form by an analog-to-digital converter 52 and presented to both a phoneme pattern matcher 54 and an amplitude measurer 56. A phoneme pattern matcher 54 attempts to recognize phoneme patterns within the incoming speech stream. Such phoneme recognition output is provided to a word pattern matching block 58 that recognizes words in whatever appropriate language is being spoken by player 12(2). Blocks 54, 58 are conventional and may be supplied by any suitable speech-to-text conversion algorithm as is well known by those skilled in the art.

In the example shown, amplitude measurement block 56 provides an average amplitude output indicating the amplitude or loudness at which player 12(2) spoke the words into the microphone.

As shown in FIG. 3, the amplitude and content (word recognition) outputs provided by the FIG. 2 example speech-to-text converter are analyzed using an illustrative, non-limiting exemplary analysis route that detects characteristics in the incoming speech signals. In the particular illustrative non-limiting example shown, the analyzer 60 determines whether a recognized word is a known stress word such as "blast", "friend", "enemy", "shoot", or other special word (decision block 62). If the word is a known stress word ("yes" exit to decision block 62), then the analyzer 60 may add appropriate formatting information such as for example "display color=red" (block 64). Similarly, if the average amplitude of the utterance is above a certain threshold level A (as tested for by decision block 66), analyzer 60 may similarly provide appropriate formatting such as color, font, etc. (block 64). In the example shown, if the recognized voice is not a known stress word and the average amplitude does not exceed a certain threshold level A ("no" exit to decision block 66), then the analyzer 60 may decide to display the associated text in a normal color (block 68), but may perform a further test to determine whether the amplitude is above a threshold B (which may be lower than threshold A for example) (decision block 70). If the amplitude level is higher than B ("yes" exit to decision block 70), then the analyzer may increment the font size to result in a larger font, an all caps display, or any other perceptible indicia (block 72). Otherwise, the analyzer 60 may set the font size as "normal" (block 74).

In one exemplary illustrative non-limiting implementation, the analyzer 60 may perform additional functionalities such as for example filtering or replacement of words (e.g., to screen out bad language). Word substitution is possible using for example a database of word substitutions. The display instructions 108 shown in FIG. 4 may provide a conventional scroll-back capability so that game players 12 can scroll back and review a history of some substantial portion of the text resulting from previous game play. This provides a record for ready reference. Different display text may be tagged with the identity of the player who uttered the associated speech so that different statements can be attributed to different players.

Figure 4:
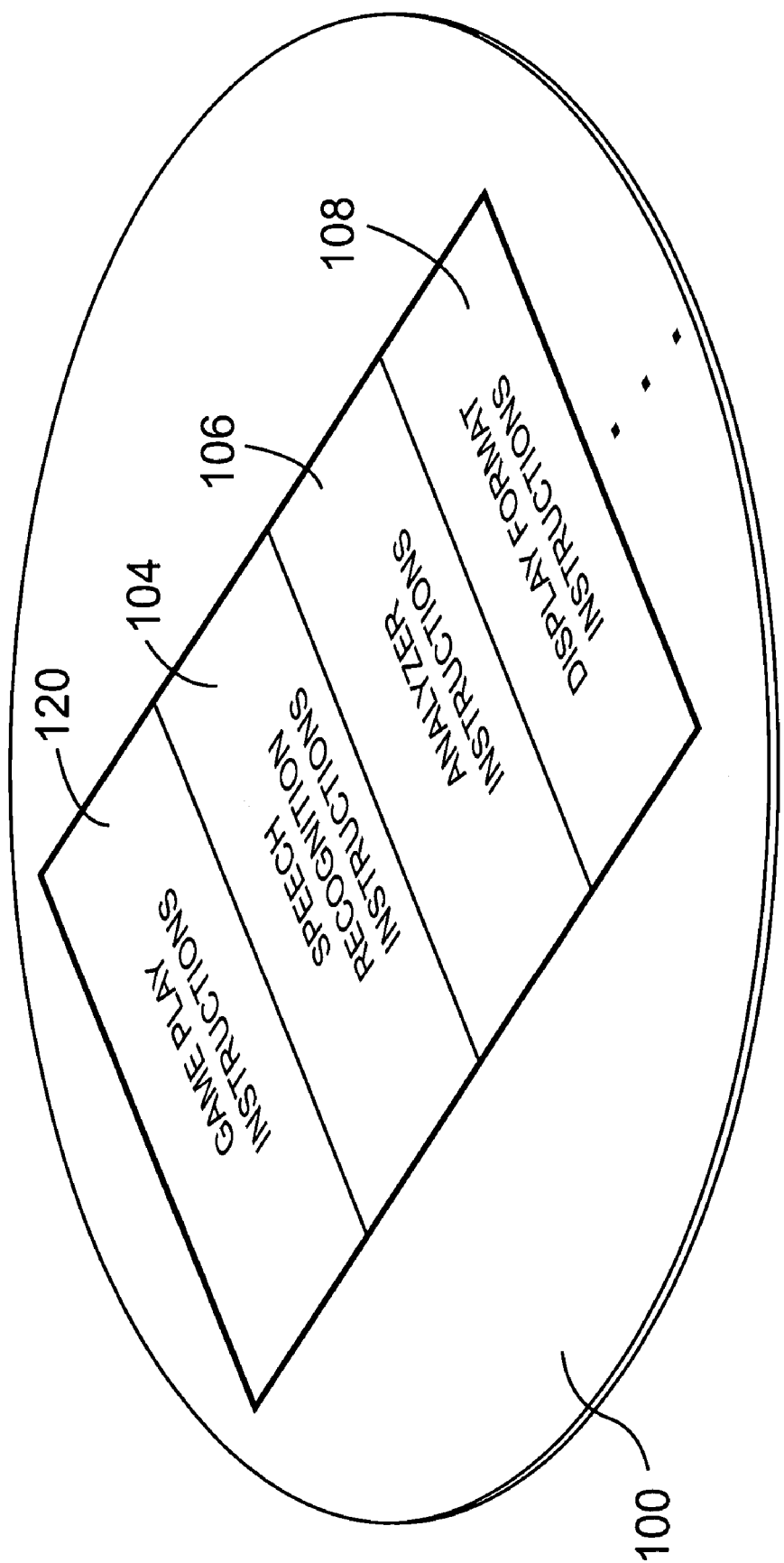
FIG. 4 shows an example illustrative non-limiting implementation of a program instruction storage medium.

FIG. 4 shows an example storage medium 100 that stores instructions for execution by game playing equipment 16 and/or game server 28. Such instructions may include for example game play instructions 102, speech recognition instructions 104 implementing the functionality shown in FIG. 2, analyzer instructions 106 implementing the analyzer functionality shown in FIG. 3, and display instructions for providing visually perceptible formatted textual displays on display device 20.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:

1. A multi-player video game playing method for use with a networked multi-player video game playing system that, in use, accepts interactive inputs from a first game player and additional inputs from at least a second game player over a network and thereby provides interactive multiplayer game play for both said first game player and said second game player, said method comprising:
   receiving user inputs from said first game player manipulating at least a first handheld video game controller;
   communicating multiplayer game playing information over a network with the second game player's video game playing system;
   displaying, in a coordinated manner on a first display associated with said first game player and on a second display associated with said second game player, multiplayer interactive video game play at least in part in response to said received user input and said communicated multiplayer game playing information;
   sensing audible speech uttered by the first game player;
   automatically, by computer, converting the sensed uttered speech to written text;
   analyzing said speech and/or said text for aggressive content; and
   generating formatting for said text for display to the second video game player on the second display, including formatting at least a portion of said displayed text in a way so that as displayed on the second display the formatting of the text display at least in part reflects how aggressive the first game player's speech is.

2. The method of claim 1 wherein said formatting includes aggression-indicating font size.

3. The method of claim 1 wherein the formatting includes aggression-indicating font color.

4. The method of claim 1 wherein the formatting includes aggressive punctuation.

5. The method of claim 1 wherein the formatting includes aggression-indicating font style.

6. The method of claim 1 wherein the characteristic comprises aggression-indicating uttered speech amplitude.

7. The method of claim 1 wherein the aggressive content comprises use of predetermined stress words.

8. The method of claim 1 wherein the aggressive content comprises audible voice features that reflect aggression.

9. The method of claim 1 wherein the aggressive content comprises a threat.

10. Video game playing equipment comprising:
    at least one handheld game controller that in use provides local input from a first video game player;
    a computing device executing video game play instructions at least in part in response to said local input from said first video game player via said at least one handheld game controller and at least in part in response to additional signals communicated over a network from a second video game player remote to said first video game player, to provide a multiplayer video game display;
    a microphone that, in use, receives audible speech from said first video game player;
    a speech-to-text converter that automatically converts said received audible speech into written text;
    an analyzer that analyzes said audible speech and/or text to determine whether at least one predetermined aggression characteristic is present in utterance by said first video game player; and
    a text formatter that selectively formats said text for display on a second display associated with said second video game player to demonstrate, to said second video game player, aggression of said first video game player at least in part in response to said analyzer determination.

11. A video game chat system comprising:
    a plurality of video game play sites, each said site including a user input device and a display, said displays providing coordinated interactive video game play in response to user inputs said user input devices provide, wherein at least one of said sites further includes an audio transducer that picks up audible speech uttered by a first game player;
    a speech recognizer coupled to said audio transducer, said speech recognizer converting said first game player's audible speech into displayable indicia and further analyzing said audible speech to determine whether a predetermined characteristic indicating emotion is present therein; and
    a display formatter that displays said displayable indicia on at least one of said displays to at least a second game player different from said first game player, said display formatter formatting said display to show first game player's emotion to said second game player at least in part in response to whether said predetermined characteristic is present in said first player's audible speech.

12. The system of claim 11 wherein said emotion comprises aggression.

13. A multi-player video game playing method for use with a networked multi-player video game playing system that, in use, accepts interactive inputs from a first game player and additional inputs from at least a second game player over a network and thereby provides interactive multiplayer game play for both said first game player and said second game player, said method comprising:
    receiving user inputs from said first game player manipulating at least a first handheld video game controller;
    communicating multiplayer game playing information over a network with the second game player's video game playing system;
    displaying, in a coordinated manner on a first display associated with said first game player and on a second display associated with said second game player, multi-player interactive video game play at least in part in response to said received user input and said communicated multiplayer game playing information;
    sensing audible speech uttered by the first game player;
    automatically, by computer, converting the first player's uttered speech to text;
    analyzing said speech and/or said text for emotional content; and
    formatting said text for display to said second video game player, including formatting at least a portion of said text n a way so that as displayed on the second display screen the format of said text display at least in part graphically reflects said emotional content.

14. Video game playing equipment comprising:
    at least one handheld game controller that in use provides local input from a first video game player;
    a computing device executing video game play instructions at least in part in response to said local input from said first video game player via said at least one handheld game controller and at least in part in response to additional signals communicated over a network from a second video game player remote to said first video game player, to provide a multiplayer video game display;
    a microphone that, in use, receives speech from at least the second game player;
    a speech-to-text converter that converts said received speech into text;
    an analyzer that analyzes said speech and/or text to determine whether at least one predetermined emotional characteristic is present; and
    a text formatter that selectively formats said text to graphically show, with said formatting, emotion on the display at least in part in response to said analyzer determination.

* * * * *